(12) United States Patent
Chen

(10) Patent No.: US 6,319,583 B1
(45) Date of Patent: Nov. 20, 2001

(54) LUBRICATED AND OVERCOATED MAGNETO-OPTICAL MEDIA WITH IMPROVED TRIBOLOGICAL PERFORMANCE

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/268,325

(22) Filed: Mar. 16, 1999

Related U.S. Application Data

(60) Provisional application No. 60/078,614, filed on Mar. 19, 1998.

(51) Int. Cl.$^7$ .................................................. G11B 5/66
(52) U.S. Cl. ............... 428/64.3; 428/65.8; 428/694 ML; 428/694 SC; 428/694 DE; 428/694 TF; 428/694 BF; 428/900; 369/13
(58) Field of Search ................... 428/694 ML, 694 SC, 428/694 DE, 694 TF, 694 BF, 900, 64.3, 65.8; 369/13

(56) References Cited

U.S. PATENT DOCUMENTS

| | | | |
|---|---|---|---|
| 5,112,662 | 5/1992 | Ng | 428/64.3 |
| 5,266,409 * | 11/1993 | Schmidt | 428/446 |
| 5,386,400 | 1/1995 | Nakayama et al. | 369/13 |
| 5,470,627 | 11/1995 | Lee et al. | 428/64.4 |
| 5,475,673 | 12/1995 | Adkins | 369/286 |
| 5,527,479 | 6/1996 | Nagataki et al. | 508/205 |
| 5,578,355 | 11/1996 | Hirata et al. | 428/64.3 |
| 5,580,633 | 12/1996 | Kuwahara et al. | 428/64.3 |
| 5,604,005 * | 2/1997 | Endo | 428/64.3 |
| 5,618,617 | 4/1997 | Uchida et al. | 428/323 |
| 5,648,162 * | 7/1997 | Hirokane | 428/332 |
| 5,694,379 | 12/1997 | Aratani et al. | 369/13 |
| 5,750,210 | 5/1998 | Schmidt et al. | 427/577 |

* cited by examiner

Primary Examiner—Leszek Kiliman

(57) ABSTRACT

Magneto-optical information storage media having improved tribological properties when used in high-density storage devices employing very small head flying heights are formed by providing by a protective overcoat/lubricant topcoat layer system on the media surface. Embodiments of the present invention include forming the protective overcoat layer of an amorphous, abrasion resistant, carbon-based, diamond-like material less than about 50 Å thick selected from $CN_x$, $CH_x$, and $CN_xH_y$, and forming the lubricant topcoat at a thickness of 15–25 Å, of a medium molecular weight linear chain perfluoro polyalkylene polymer having

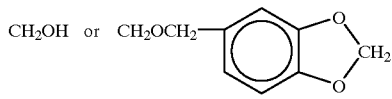

reactive end groups for bonding the polymer molecules to the protective overcoat layer.

19 Claims, 2 Drawing Sheets

LUBRICATED AND OVERCOATED MAGNETO-OPTICAL MEDIA WITH IMPROVED TRIBOLOGICAL PERFORMANCE

CROSS-REFERENCE TO PROVISIONAL APPLICATION

This application claims priority from provisional patent application Ser. No. 60/078,614 filed Mar. 19, 1998, the entire disclosure of which is incorporated herein by reference.

FIELD OF THE INVENTION

The present invention relates to the recording, storage, and reading of information utilizing magneto-optical (MO) media, particularly rotatable MO storage media, such as in the form of thin film disks, and a protective overcoat/lubricant topcoat layer system for contact with cooperating transducer and/or sensor heads or devices.

BACKGROUND OF THE INVENTION

In recent years, much research and development of MO recording media for use as high density/high capacity memory devices has been carried out. Such media typically comprise a suitable substrate, e.g., of glass, polymer, metal, or ceramic material, coated with a perpendicularly magnetizable film used as a recording medium. Information is recorded within the medium by switching the direction of magnetization of desired portions (i.e., domains) of the perpendicularly magnetizable film. More specifically, for recording information, the recording medium is first initialized by applying to the medium a magnetic field from an externally positioned magnetic field generation device (i.e., external magnetic bias), thereby making the direction of the perpendicular magnetization uniformly upwardly or downwardly facing. A first laser beam of sufficiently high power or intensity from a suitable source, e.g., a laser diode, is then irradiated on desired recording portions of the recording medium in the presence of an external biased magnetic field. As a consequence of the laser beam irradiation, the temperature of the irradiated portions (domains) of the recording medium rises, and when the temperature reaches or exceeds the Curie point of the vertically magnetizable film or its magnetic compensation point, the coercive force on the recording portion becomes zero or substantially zero. When this state is achieved at the desired recording portions of the medium, and in the presence of the externally biased magnetic field, the direction of the perpendicular magnetization is switched, e.g., from upwardly facing (=digital logic 1 or 0) to downwardly facing (=digital logic 0 or 1, respectively) and vice versa, so as to be aligned with that of the external magnetic field. At the end of a write pulse (i.e., laser pulse), the temperature of the heated recording domain then decreases and eventually returns to room temperature by ceasing laser beam irradiation thereof. Since the alignment direction of magnetization of the recording media effected by the laser pulse heating to above the Curie temperature is maintained at the lowered temperature, desired information can thus be recorded in the magneto-optical media.

For reading the information stored in the MO media according to the above-described method, the recorded portions of the media are irradiated with a second, linearly polarized laser beam of lower power or intensity than the one used for recording, and light reflected or transmitted from the recorded portions is detected, as by a suitable detector/sensor means. The recorded information is read out by detecting the Kerr rotation angle of the polarization plane of light reflected from the recording layer or the Faraday rotation angle of the polarization plane of light transmitted through the recording layer. More particularly, since the rotation angle of the polarization plane varies depending upon the direction of magnetization of the recorded portions of the media according to the Kerr or Faraday effect, information stored within the media can be read out optically by a differential detector which decodes the polarization-modulated light beam into bits of information.

Such MO recording media, when fabricated in disk form for rotation about a central axis, can be adapted for use in conventional Winchester, or hard drive, devices as are employed with conventional magnetic recording media. Hard drives typically employed for such disk-shaped media utilize flying heads for mounting transducer/sensor devices, etc., thereon, for close positioning thereof adjacent the surface of the recording media. In operation, a typical contact start/stop (CSS) method commences when a data transducing head begins to slide against the surface of the disk as the disk begins to rotate. Upon reaching a predetermined high rotational speed, the head floats in air at a predetermined small distance from the surface of the disk, where it is maintained during reading and recording operations. Upon terminating operation of the disk drive, the head again begins to slide against the surface of the disk and eventually stops in contact with and pressing against the disk. Therefore, as in the case of magnetic disks, a lubricant (optionally with an underlying protective layer) is typically applied to the disk surface for minimizing scratching and abrasion of the sensor/transducer head and the recording media surface, which can result in an undesirably high wear rate of the head and recording media surface, as disclosed in, e.g., U.S. Pat. Nos. 5,386,400; 5,618,617; 5,578,355; 5,527,479; 5,112,662; and 5,604,005.

However, in the case of portable MO recording devices, the use of a lubricating oil, e.g., a fluorocarbon-based oil, is problematic in that it is difficult to maintain the lubricating oil on the surface of the MO media, thereby increasing surface scratching and wear. In addition, MO disks produced without lubricating oil on their surface by some manufacturers are not necessarily compatible with similar media produced with lubricating oil by other manufacturers.

In another approach for minimizing abrasion, scratching, and wear of transducer heads, a solid lubricant is applied to the bottom surface of the flying head which comes into contact with the surface of the MO recording medium. However, such solid lubricant applied to the bottom surface of the flying head must have a durability many times greater than lubricant applied to the MO recording medium. As a consequence, application of solid lubricant only to the flying head is not sufficient for adequately reducing abrasion, scratching, and wear.

An additional difficulty encountered in the development of wear-resistant, lubricated MO recording media and Winchester-type drives therefor, is the requirement imposed by the impetus for achieving ever-higher density recording, which necessitates further reduction in the disk-transducer/sensor spacing. The head-to-disk interface (HDI) becomes very critical as head-disk spacing is reduced and head fly height decreases. Conventional MO media without a protective overcoat and lubricant layer have extremely poor tribological performance, resulting in lack of reliability of MO-based disk drives.

Thus, there exists a need for a protective overcoat/lubricant topcoat layer system which enables the manufacture of reliable, very high density recording MO-based disk drives, which layer system effectively eliminates the problems and drawbacks associated with the conventional MO-based technology, i.e., scratching, abrasion, and increased wear of transducer/sensor head and recording media surfaces.

The present invention addresses and solves the problems attendant upon the use of conventional MO-based disk-shaped recording media and hard drives, while maintaining full compatibility with all mechanical aspects of conventional disk drive technology.

DISCLOSURE OF THE INVENTION

An advantage of the present invention is a high density MO-based recording media having improved tribological performance.

Another advantage of the present invention is a MO-based recording media having an improved protective overcoat layer/lubricant topcoat layer system.

Yet another advantage of the present invention is a MO-based disk-shaped recording media providing improved performance at decreased head-to-disk spacings.

Still another advantage of the present invention is single- and dual-sided MO-based media having protective overcoat layer/lubricant topcoat layer systems thereon providing improved tribological performance.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a MO storage media comprising a laminate including at least one MO read/write layer formed over a substrate and covered by a dielectric layer which is transparent to the wavelength of at least one laser beam used for writing and reading out information stored in the media, the media further comprising:

an amorphous, abrasion resistant protective overcoat layer comprising a carbon-based, diamond-like material over the transparent dielectric layer; and a perfluoropolyether-based lubricant topcoat layer on the protective layer.

According to embodiments of the present invention, the amorphous, diamond-like protective overcoat layer is less than about 50 Å thick and comprises a material selected from a-$CN_x$, a-$CH_x$, and a-$CN_xH_y$; the perfluoropolyether-based lubricant topcoat layer is from about 15 Å to about 25 Å thick and comprises a linear chain perfluoro polyalkylene polymer having the structural formula:

$$X-CF_2-[(OCF_2-CF_2)_m(OCF_2)_n]-OCF_2-X,$$

wherein n and m are each in the range from about 5 to about 30, preferably from about 10 to about 20 (corresponding to molecular weights from about 2,000 to about 4,000), n/m is approximately 1, and X=a reactive group for bonding the polymer to the surface of the protective overcoat layer, and is selected from

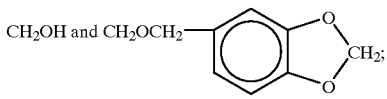

the substrate includes a pair of opposed major surfaces and comprises a material selected from polymers, metals, glass, and ceramics.

In embodiments according to the present invention, the laminate comprises a stack of layers formed on one of the pair of opposed major surfaces, the layer stack comprising, in overlying sequence from the substrate: (a) a reflective, heat sinking layer formed on the one of the pair of opposed major surfaces of the substrate; (b) a first dielectric layer comprising a material which is transparent to the at least one laser beam wavelength; (c) a MO read/write layer comprising a rare earth/transition metal (RE/TM) material having perpendicular anisotropy; (d) a second dielectric layer comprising a material which is transparent to the at least one laser beam wavelength, wherein the protective overcoat layer is formed on the second, transparent dielectric layer and the lubricant topcoat layer is formed on the protective overcoat layer.

According to an embodiment of the present invention, the reflective, heat sinking layer comprises aluminum (Al) or an alloy thereof; each of the first and second transparent dielectric layers comprises a material selected from $SiN_x$, $AlN_x$, $SiO_x$, and $AlO_x$; and the MO read/write layer comprises a material selected from TbFe, TbFeCo, and DyFeCo.

In a further embodiment of the present invention, the laminate comprises another layer stack, identical to the above-said layer stack, formed on the other one of the pair of opposed major surfaces of the substrate.

In a still further embodiment according to the present invention, the laminate comprises a stack of layers formed on one of the pair of opposed major surfaces of the substrate, the layer stack comprising, in overlying sequence from the substrate: (a) a reflective, heat sinking layer formed on one of the pair of opposed major surfaces of the substrate; (b) a first dielectric layer comprising a material which is transparent to the at least one laser beam wavelength; (c) a MO auxiliary, writing assist layer comprising a RE/TM material; (d) a MO writing layer comprising a RE/TM material having perpendicular anisotropy; (e) a second dielectric layer comprising a material which is transparent to the at least one laser beam wavelength; (f) a MO readout layer comprising a RE/TM material; and (g) a third dielectric layer comprising a material which is transparent to said at least one laser beam wavelength, wherein the protective overcoat layer is formed on the third, transparent dielectric layer and the lubricant topcoat layer is formed on the protective overcoat layer.

In embodiments according to the present invention, the reflective, heat sinking layer comprises Al or an alloy thereof; each of the first, second, and third transparent dielectric layers comprises a material selected from $SiN_x$, $AlN_x$, $SiO_x$, and $AlO_x$; the MO auxiliary, writing assist layer comprises a material selected from TbFe, TbFeCo, and FeCoX, where X is Dy, Gd, or Sm; the MO writing layer comprises a material selected from TbFe, TbFeCo, GLC, TbFeCoAl, TbFeCoY, TbFeCoNd, DyFeCoAl, DyFeCoNd, and DyFeCoY; and the MO readout layer comprises a RE/TM material selected from GdFeCo, GLC GdFeCoAl, GdFeCoNd, GdFeCoY, and GdFeCoXX' where X is Al, Y, or Nd and X' is Cr, Ta, or Nb.

In further embodiments according to the present invention, the laminate comprises another layer stack, identical to the above-said layer stack, formed on the other one of the pair of opposed major surfaces of the substrate.

Additional advantages of the present invention will become readily apparent to those skilled in the art from the following detailed description, wherein only preferred embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiments of the present invention can best be understood when read in conjunction with the following drawings, in which like reference numerals are employed throughout to designate similar features, wherein.

DESCRIPTION OF THE INVENTION

Figure 1:
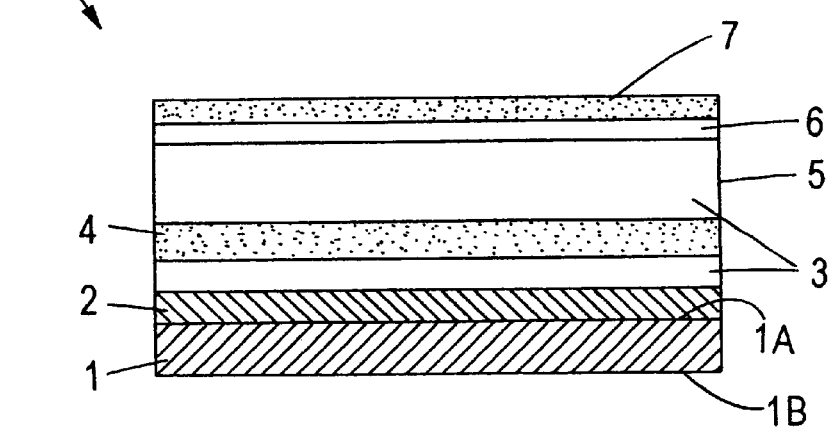
FIG. 1 illustrates, in simplified, cross-sectional schematic form, a MO medium according to a first, single-sided embodiment according to the present invention.

The present invention is based on the discovery that a protective overcoat/lubricant topcoat layer system comprised of specific materials can provide optimal tribological performance of MO-based media, such as disks, with minimal lubricant topcoat layer thicknesses and head-to-disk spacings (i.e., flying heights) less than about 20 microinches. More specifically, according to the present invention, a thin protective overcoat layer comprising an amorphous, hard, carbon-based abrasion resistant protective material, e.g., a carbon-based diamond-like material such as a-$CN_x$,(where x=0.05–0.30), a-$CH_x$ (where x=0.20–0.30), and a-$CN_xH_y$ (where x=0.03–0.10 and y=0.15–0.30), is formed to cover the transparent dielectric layer, typically a $SiN_x$ material, formed over the MO layer of such type MO media. The amorphous, diamond-like protective overcoat layer has a thickness less than about 50 Å, e.g., 10–25 Å, and can be formed by any of the physical vapor deposition (PVD) or chemical vapor deposition (CVD) methods conventionally employed for depositing such type layers. By way of illustration, but not limitation, a-$CH_x$ layers may be deposited on suitable dielectric coated MO substrates by AC sputtering of a 3 inch by 15 inch graphite target at frequencies in the range of 40–400 KHz at a power in the range of 0.5–2 KW in an atmosphere of 15% $H_2$/85% Ar. Similar conditions may be employed for forming a-$CN_x$ and a-$CN_xH_y$ coatings by use of $N_2$ and $H_2$—$N_2$ mixtures, respectively. Given the present disclosure and the objectives of the invention, determination and selection of the parameters necessary for obtaining equivalently performing diamond-like amorphous carbon-containing coatings by other conventional film-forming techniques is considered within the ambit of the artisan for use in a particular situation.

The lubricant topcoat layer applied over the protective overcoat layer, according to the present invention, comprises a perfluoropolyalkylene polymer having the following structural formula:

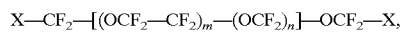

wherein:

n and m are each in the range from about 5 to about 30, preferably from about 10 to about 20, n/m is approximately 1, and X is a reactive end group comprising a functional group for bonding the lubricant molecule to the surface of the substrate (i.e., the amorphous, diamond-like protective overcoat layer), 13 thereby preventing the lubricant topcoat layer from being displaced during the disk read/write head contact and during rotation at high velocity.

In embodiments according to the invention, the reactive end groups X are selected from

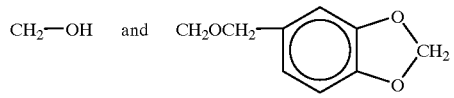

groups, n and m are selected to provide a medium molecular weight (MMW) of about 2,000, and the lubricant topcoat layer has a thickness in the range of from about 15 Å to about 25 Å.

The lubricant topcoat layer can be applied in any conventional manner, as by dipping in a dilute solution of the lubricant in a suitable solvent, e.g., a hydrofluorocarbon, or by spraying, etc. Desirably, the surface of the disk is preliminarily treated to be free of impurities so that good bonding can occur between the functional end groups X and the substrate surface (i.e., the protective overcoat layer). The bonding of the lubricant to the surface of the disk can be enhanced by cleaning the surface of the protective overcoat layer with a mild plasma or a solvent rinse prior to applying the lubricant.

By way of illustration, but not limitation, MO media provided with an amorphous, diamond-like protective overcoat layer and coated with 15–25 Å thick lubricant topcoat layers of MMW (i.e., about 2,000) perfluoro polyalkylene polymer with

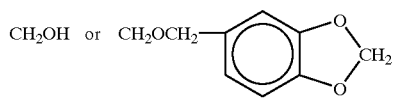

functional end groups (Fomblin Zdol and Fomblin AM2001 (Ausimont, Thorofare, N.J.), provided excellent tribological properties at reduced fly heights of from about 20 to less than about 1 microinch, depending upon the material of the disk substrate, e.g., polymeric or glass-based, with glass-based disks providing smaller fly heights than polymer-based disks. More specifically, the tribological performance of various protective overcoat/lubricant topcoat systems can be ranked as follows:

| Poorest | | | | Best |
|---------|---|---|---|------|
| SiN$_x$ only | SiN$_x$ | SiN$_x$ | SiN$_x$ | SiN$_x$ |
| No carbon | No carbon | No carbon | With carbon | With carbon |
| No lub. | HMW ZDol | MMW ZDol | HMW lub. | MMW lub. |

The protective overcoat/lubricant topcoat layer system according to the present invention can be applied to a variety of MO media, several examples of which are described below with reference to FIGS. 1–4, by way of illustration but not limitation.

A first embodiment of a single-sided MO media 10 employing the inventive protective overcoat/lubricant topcoat layer system is illustrated in FIG. 1, wherein reference numeral 1 denotes a substrate comprising a pair of major opposed surfaces 1A and 1B. The material of the substrate is not critical for the practice of the invention, and may be selected from polymers, metals, glass, and ceramics. The thickness of substrate 1 is also not critical, but must provide adequate rigidity during rotation and static periods.

Formed on a first one (1A) of the opposing major surfaces of substrate 1 is a layer stack, comprising, in overlying sequence from substrate surface 1A: (a) a reflective, heat-sinking layer 2 about 300–400 Å thick, typically comprising Al or an alloy thereof, e.g., AlCr, AlTi, etc.; (b) a first layer 3 comprised of a dielectric material, about 100–400 Å thick and transparent to the wavelength(s) of the at least one laser beam employed for writing and reading out information, typically selected from SiN$_x$ (where x=ca. 0.8–1.33), AlN$_x$ (where x=ca. 1–1.5), SiO$_x$ (where x=ca. 1–2.0), and AlO$_x$ (where x=ca. 1–1.5); (c) a MO read/write layer 4 comprising a RE/TM material about 200–300 Å thick and having perpendicular anisotropy, typically selected from TbFe, TbFeCo, and DyFeCo; (d) a second layer 5 comprised of a dielectric material, about 800–1,200 Å thick and transparent to the wavelength(s) of the at least one laser beam employed for writing and reading out information, typically selected from SiN$_x$, AlN$_x$, SiO$_x$, and AlO$_x$, wherein x in each instance is as given above for first layer 3; (e) an amorphous, carbon-based, diamond-like protective overcoat layer 6 less than about 50 Å thick, and comprised of a material as described supra, i.e., a-CN$_x$ (where x=0.05–0.30), a-CH$_x$ (where x=0.20–0.30), or a-CN$_x$H$_y$ (where x=0.03–0.10 and y=0.15–0.30); and (f) a lubricant topcoat layer 7 comprised of a perfluoropolyether compound, typically a MMW linear chain perfluoro polyalkene polymer having

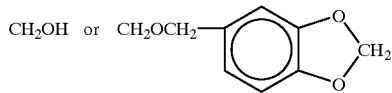

functional end groups and a thickness of about 15–25 Å.

A second embodiment of a single-sided MO media employing the inventive protective layer/lubricant topcoat layer system will now be described with reference to FIG. 2. As illustrated therein, MO media 20 comprises a substrate 11 formed of a material selected from polymers, metals, glass, and ceramics and includes a pair of major opposed surfaces 11A and 11B. As in the previous embodiment, the thickness of substrate 11 is not critical, provided adequate rigidity is exhibited during rotation and static periods.

Formed on a first one (11A) of the opposing major surfaces of substrate 11 is a layer stack, comprising, in overlying sequence from substrate surface 11A: (a) a reflective, heat-sinking layer 12 about 300–400 Å thick, typically comprising Al or an alloy thereof, e.g., AlCr, AlTi, etc.; (b) a first layer 13 comprising a dielectric material, about 100–400 Å thick and transparent to the wavelength(s) of the at least one laser beam employed for writing and reading out information, typically selected from SiN$_x$ (where x=ca. 0.8–1.33), AlN$_x$ (where x=ca. 1–1.5), SiO$_x$ (where x=ca. 1–2.0), and AlO$_x$ (where x=1–1.5); (c) a MO auxiliary, writing assist layer 14 comprising a RE/TM material about 50–100 Å thick, typically selected from TbFe, TbFeCo, and FeCoX, where X is Dy, Gd, or Sm; (d) a MO writing layer 15 comprising a RE/TM material about 200–300 Å thick and having perpendicular anisotropy, typically selected from TbFe, TbFeCo, TbFeCoX, where X is Al, Y, or Nd, and DyFeCoX, where X is Y, Nd, or Al; (e) a second layer 16 comprising a dielectric material, about 50–200 Å thick and transparent to the wavelength(s) of the at least one laser beam employed for writing and reading out information, typically selected from SiN$_x$, AlN$_x$, SIO$_x$, or AlO$_x$, where x in each instance is as given above for layer 13; (f) a MO readout layer 17 comprising a RE/TM material about 200–400 Å thick, typically selected from GdFeCo, GdFeCoX, where X is Al, Nd, or Y, and GdFeCoXX', where X is 5 Al, Nd, or Y, and X' is Cr, Ta, or Nb; (g) a third layer 18 comprising a dielectric material, about 800–1,200 Å thick and transparent to the wavelength(s) of the at least one laser beam employed for writing and reading out information, typically selected from SiN$_x$, AlN$_x$, SiO$_x$, and AlO$_x$, where x in each instance is as given above for layer 13; (h) an amorphous, diamond-like protective overcoat layer 19 less than about 50 Å thick, comprising a material as described supra, i.e., a-CN$_x$ (where x=0.05–0.30), a-CH$_x$ (where x=0.20–0.30), or a-CN$_x$H$_y$ (where x=0.03–0.10 and y=0.15–0.30); and a lubricant topcoat layer 21 having a thickness of about 15–25 Å and comprised of a perfluoropolyether compound, typically a MMW linear chain perfluoro polyalkylene polymer having

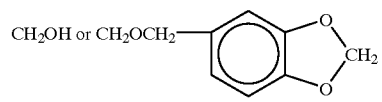

functional end groups.

Figure 2:
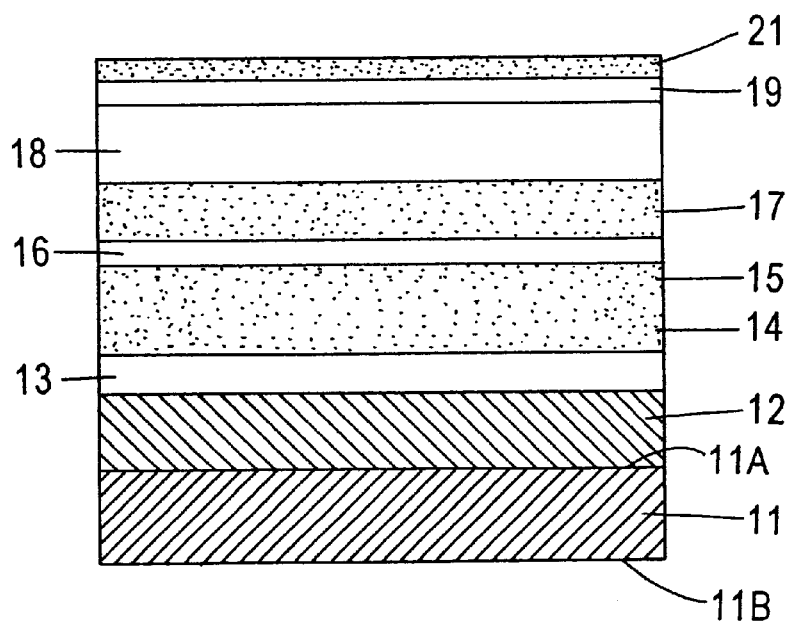
FIG. 2 illustrates, in simplified, cross-sectional schematic form, a MO medium according to a second, single-sided embodiment according to the present invention.
Figure 3:
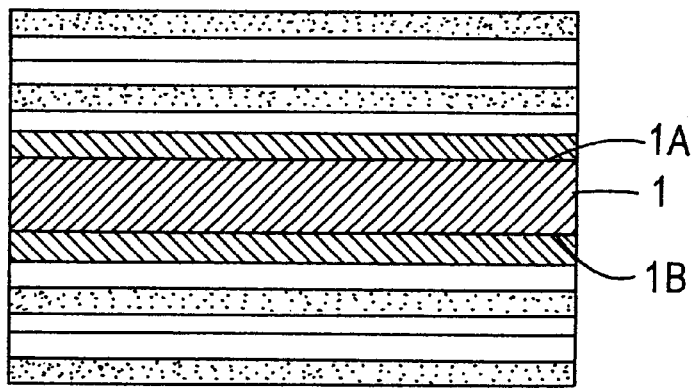
FIG. 3 illustrates, in simplified, cross-sectional schematic form, a MO medium according to a third, dual-sided embodiment according to the present invention.
Figure 4:
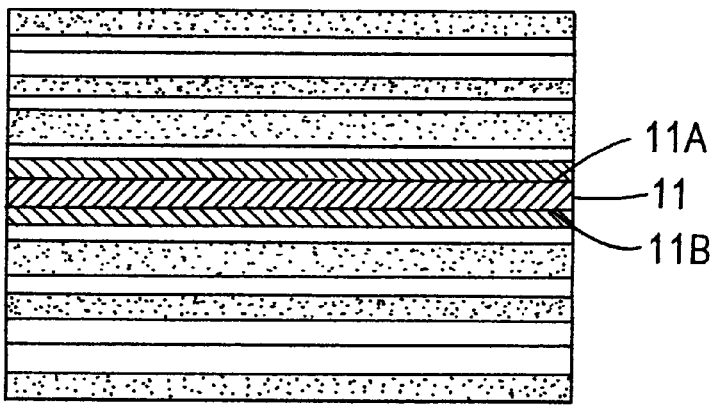
FIG. 4 illustrates, in simplified, cross-sectional schematic form, a MO medium according to a fourth, dual-sided embodiment according to the present invention.

FIGS. 3 and 4 illustrate dual-sided, third and fourth embodiments respectively corresponding to the single-sided, first and second embodiments shown in FIGS. 1 and 2. Such dual-sided media advantageously may be operated to record and read out information from both sides of a common substrate, and thus are useful for increasing storage density. As for the third embodiment of FIG. 3, media 30 comprises a second layer stack formed on the second major surface 1B of substrate 1, in opposing relation to the first layer stack formed on the first major surface 1A, with both layer stacks being identically constituted as shown in FIG. 1. In similar fashion, in the embodiment of FIG. 4, media 40 comprises a second layer stack formed on the second major surface 10B of substrate 10, in opposing relation to the first layer stack formed on the first major surface 10A, with both layer stacks being identically constituted as shown in FIG. 2.

Conventional techniques, such as PVD and/or CVD may be employed for depositing each of the reflective, dielectric, MO RE/TM, and protective overcoat layers of the layer stacks of the above-described embodiments, with sputtering generally preferred. The lubricant topcoat layer is readily deposited by conventional dipping techniques, as indicated above. Therefore, details of the deposition techniques utilized for forming each of the layers of the layer stack are generally omitted from the present disclosure for brevity and in order not to unnecessarily obscure the present invention.

Thus, the present invention advantageously provides, as by the use of conventional processing techniques, high quality MO media having improved tribological properties and therefore suitable for use in high density storage devices requiring minimal head fly height.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magneto-optical storage medium comprising a laminate including at least one magneto-optic read/write layer formed over a substrate and covered by a dielectric layer which is transparent to the wavelength(s) of at least one laser beam used for writing and reading out information stored in said medium, said medium further comprising:

an amorphous, abrasion resistant, carbon-based protective overcoat layer having a thickness less than about 50 Å over said transparent dielectric layer; and a perfluoropolyether-based lubricant topcoat layer having a thickness of from about 15 to about 25 Å on said protective overcoat layer.

2. The medium according to claim 1, wherein:

said abrasion resistant protective overcoat layer comprises a carbon-based, diamond-like material selected from a-$CN_x$, a-$CH_x$, and a-$CN_xH_y$.

3. The medium according to claim 2, wherein said protective overcoat layer has a thickness of from about 10 to about 25 Å.

4. The medium according to claim 1, wherein said perfluoropolyether-based lubricant topcoat layer comprises a linear chain perfluoro polyalkylene polymer having the structural formula:

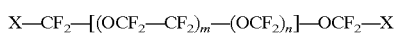

wherein: n and m are each in the range from about 5 to about 30, n/m is approximately 1, and X=a reactive end group for bonding said polymer to the surface of said protective overcoat layer.

5. The medium according to claim 4, wherein n and m are each in the range from about 10 to about 20.

6. The medium according to claim 4, wherein

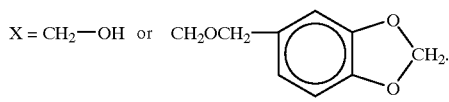

7. The medium according to claim 1, wherein said substrate includes a pair of opposed major surfaces and comprises a material selected from the group consisting of polymers, metals, glass, and ceramics.

8. The medium according to claim 7, wherein said laminate comprises a stack of layers formed on one of said pair of opposed major surfaces, said layer stack comprising, in overlying sequence from said substrate:

(a) a reflective, heat sinking layer formed on said one of said pair of opposed major surfaces of said substrate;

(b) a first dielectric layer comprising a material which is transparent to said at least one laser beam wavelength;

(c) a magneto-optical read/write layer comprising a rare earth/transition metal material having perpendicular anisotropy; and (d) a second dielectric layer comprising a material which is transparent to said at least one laser beam wavelength;

wherein said protective overcoat layer is formed on said second, transparent dielectric layer and said lubricant topcoat layer is formed on said protective layer.

9. The medium according to claim 8, wherein:

said reflective, heat sinking layer comprises aluminum or an alloy thereof;

each of said first and second transparent dielectric layers comprises a material selected from $SiN_x$, $AlN_x$, $SiO_x$, and $AlO_x$; and said magneto-optical read/write layer comprises a material selected from TbFe, TbFeCo, and DyFeCo.

10. The medium according to claim 9, wherein said laminate comprises another layer stack, identical to the abovesaid layer stack, formed on the other one of said pair of opposed major surfaces of said substrate.

11. The medium according to claim 8, wherein said laminate comprises a set of layers formed on one of said pair of opposed major surfaces, said layer set comprising, in overlying sequence from said substrate:

(a) a reflective, heat sinking layer formed on one of said pair of opposed major surfaces of said substrate;

(b) a first dielectric layer comprising a material which is transparent to said at least one laser beam wavelength;

(c) a magneto-optical auxiliary, writing assist layer comprising a rare earth/transition metal material;

(d) a magneto-optical writing layer comprising a rare earth/transition metal material having perpendicular anisotropy;

(e) a second dielectric layer comprising a material which is transparent to said at least one laser beam wavelength;

(f) a magneto-optical readout layer comprising a rare earth/transition metal material; and (g) a third dielectric layer comprising a material which is transparent to said at least one laser beam wavelength;

wherein said protective overcoat layer is formed on said third, transparent dielectric layer and said lubricant topcoat layer is formed on said protective layer.

12. The medium according to claim 11, wherein:

said reflective, heat sinking layer comprises aluminum or an alloy thereof;

each of said first, second, and third transparent dielectric layers comprises a material selected from $SiN_x$, $AlN_x$, $SiO_x$, and $AlO_x$;

said magneto-optical auxiliary, writing assist layer comprises a material selected from TbFe, TbFeCo, and FeCoX, where X is Dy, Gd, or Sm;

said magneto-optical writing layer comprises a material selected from TbFe, TbFeCo, TbFeCoX, where X is Al, Y, or Nd, and DyFeCoX, where X is Y, Nd, or Al; and said magneto-optical readout layer comprises a rare earth/ transition metal material selected from GdFeCo, GdFeCoX, where X is Al, Nd, or Y, and GdFeCoXX', where X is Al, Nd, or Y and X' is Cr, Ta, or Nb.

13. The medium according to claim 12, wherein said laminate comprises another layer stack, identical to the abovesaid layer stack, formed on the other one of said pair of opposed major surfaces of said substrate.

14. A magneto-optical medium comprising a laminate including at least one magneto-optic writing layer formed over a substrate and covered by a dielectric layer which is transparent to the wavelength(s) of at least one laser beam used for writing and reading-out information stored in said medium, said disc further comprising:

an amorphous, abrasion resistant, carbon-based, protective overcoat layer over said transparent dielectric layer, said protective overcoat layer having a thickness less than about 50 Å and comprising a material selected from the group consisting of: a-$CN_x$, a-$CH_x$, and a-$CN_xH_y$; and a lubricant topcoat layer having a thickness of from about 15 Å to about 25 Å on said protective overcoat layer, said lubricant topcoat layer comprising a linear chain perfluoro polyalkylene polymer having the structural formula:

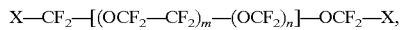

wherein: n and m are each in the range from about 5 to about 30, n/m is approximately 1, and X is a reactive end group selected from

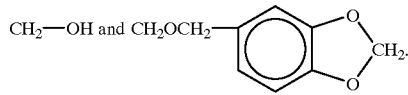

15. The medium according to claim 14, wherein said substrate includes a pair of opposed major surfaces and comprises a material selected from the group consisting of polymers, metals, glass, and ceramics.

16. The medium according to claim 15, wherein said laminate comprises a stack of layers formed on one of said pair of opposed major surfaces, said layer stack comprising, in overlying sequence from said substrate:

(a) a reflective, heat sinking layer formed on one of said pair of opposed major surfaces of said substrate and comprising aluminum or an alloy thereof;

(b) a first dielectric layer comprising a material which is transparent to said at least one laser beam wavelength and selected from the group consisting of: $SiN_x$, $AlN_x$, $SiO_x$, and $AlO_x$;

(c) a magneto-optical read/write layer comprising a rare earth/transition metal material having perpendicular anisotropy and selected from the group consisting of: TbFe, TbFeCo, and DyFeCo; and (d) a second dielectric layer comprising a material which is transparent to said at least one laser beam wavelength and selected from the group consisting of: $SiN_x$, $AlN_x$, $SiO_x$, and $AlO_x$;

wherein said protective overcoat layer is formed on said second, transparent dielectric layer and said lubricant topcoat layer is formed on said protective overcoat layer.

17. The medium according to claim 16, wherein said laminate comprises another layer stack, identical to the abovesaid layer stack, formed on the other one of said pair of opposed major surfaces of said substrate.

18. The media according to claim 15, wherein said laminate comprises a stack of layers formed on one of said pair of opposed major surfaces, said layer stack comprising, in overlying sequence from said substrate:

(a) a reflective, heat sinking layer formed on said one of said pair of opposed major surfaces of said substrate and comprising aluminum or an alloy thereof;

(b) a first dielectric layer comprising a material which is transparent to said at least at least one laser beam wavelength and selected from the group consisting of: $SiN_x$, $AlN_x$, $SiO_x$, and $AlO_x$;

(c) a magneto-optical auxiliary, writing assist layer comprising a rare earth/transition metal material selected from the group consisting of: TbFe, TbFeCo, and FeCoX, where X is Dy, Gd, or Sm;

(d) a magneto-optical writing layer comprising a rare earth/transition metal material having perpendicular anisotropy and selected from the group consisting of: TbFe, TbFeCo, TbFeCoX, where X is Al, Nd, or Y, and DyFeCoX, where X is Al, Nd, or Y;

(e) a second dielectric layer comprising a material which is transparent to said at least one laser beam wavelength and selected from the group consisting of: $SiN_x$, $AlN_x$, $SiO_x$, and $AlO_x$;

(f) a magneto-optical readout layer comprising a rare earth/transition metal material selected from the group consisting of: GdFeCo, GdFeCoX, where X is Al, Nd, or Y, and GdFeCoXX', where X is Al, Nd, or Y and X' is Cr, Ta, or Nb; and (g) a third dielectric layer comprising a material which is transparent to said at least one laser beam wavelength and selected from the group consisting of: $SiN_x$, $AlN_x$, $SiO_x$, and $AlO_x$;

wherein said protective overcoat layer is formed on said third transparent dielectric layer and said lubricant topcoat layer is formed on said protective overcoat layer.

19. The medium according to claim 18, wherein said laminate comprises another layer stack, identical to the abovesaid layer stack, formed on the other one of said pair of opposed major surfaces of said substrate.

* * * * *